United States Patent [19]

Witte et al.

[11] 3,960,758
[45] June 1, 1976

[54] NON-DISCOLORING STABILIZERS

[75] Inventors: Josef Witte, Cologne; Dieter Theisen, Remscheid; Ernst Roos, Cologne; Karl Nützel, Opladen, all of Germany

[73] Assignee: Bayer Aktiengesellschaft, Germany

[22] Filed: June 28, 1974

[21] Appl. No.: 484,115

[30] Foreign Application Priority Data
July 5, 1973  Germany............................ 2334163

[52] U.S. Cl................................ 252/404; 252/391; 252/393; 260/45.7 S; 260/45.95 R
[51] Int. Cl.².......................................... C08K 15/08
[58] Field of Search......................... 260/45.75, 252; 252/391, 393

[56] References Cited
UNITED STATES PATENTS

| | | | |
|---|---|---|---|
| 2,599,544 | 6/1952 | Crouch............................. | 260/45.75 |
| 2,964,498 | 12/1960 | Taylor.............................. | 260/45.95 |
| 3,070,569 | 12/1962 | Rosenthal........................ | 260/45.75 |
| 3,297,631 | 1/1967 | Bown............................... | 260/45.75 |

Primary Examiner—Donald E. Czaja
Assistant Examiner—William E. Parker
Attorney, Agent, or Firm—Connolly and Hutz

[57] ABSTRACT

A non-discoloring stabilizer system for trans-polypentenamer of:
a. a sulphur-containing phenol of the formula:

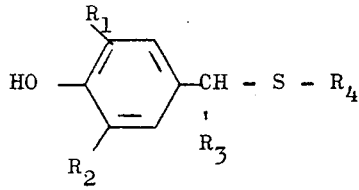

in which $R_1$ and $R_3$ are alkyl groups with 1 to 8 carbon atoms, aralkyl radicals with 7 to 9 carbon atoms and cycloalkyl radicals with 5 to 7 carbon atoms, $R_3$ represents hydrogen, alkyl groups with 1 to 8 carbon atoms, cyclohexyl, cyclohexenyl or methylcyclohexenyl, $R_4$ represents alkyl groups with 1 to 12 carbon atoms or

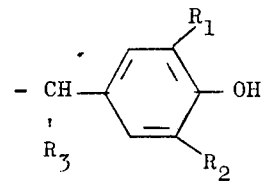

where $R_1$, $R_2$ and $R_3$ are as defined above, and
b. a phenol ester of phosphorous acid of the formula:

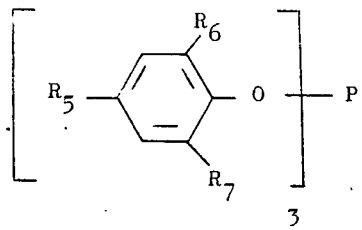

in which $R_5$ represents an alkyl or cycloalkyl group with 5 to 10 carbon atoms, $R_6$ and $R_7$ are the same or different and represent hydrogen, alkyl and cycloalkyl radicals each with 1 to 7 carbon atoms.

3 Claims, No Drawings

NON-DISCOLORING STABILIZERS

This invention relates to a non-discolouring stabiliser combination for trans-polypentenamers.

It is known that certain hydrocarbon elastomers containing carbon double bonds, for example polyisoprene or polybutadiene, can be protected against oxidation upon processing and storage by adding of sterically hindered phenols. Examples of stabilisers of this kind are 2,2'-methylene-bis-(4-methyl-6-tert.-butylphenol), 2,6-di-tert.-butyl-4-methylphenol, 2-tert.-butyl-4-methyl-6-cyclopentylphenol or 2-cyclohexyl-4-methyl-6-tert.-butylphenol.

It is also known that phenol esters of phosphorous acid can be used either alone or in combination with the aforementioned sterically hindered phenols for the same purpose.

These stabilisers and their combinations have no effect in trans-1,5-polypentenamers. On the contrary, ageing tests (Geer oven, 100°C) on polypentenamers containing these stabilisers show, after only a short time, a marked increase in Mooney vicosity, Defo hardness and Defo elasticity which is particularly troublesome. Ageing ultimately results in complete crosslinking.

Accordingly, the subject of the invention is to find a stabiliser system which provides efficient protection against ageing and does not discolour so that trans-1,5-polypentenamer can also be used in light mixtures.

This invention relates to a non-discolouring stabiliser combination consisting of a sulphur-containing phenol of the formula:

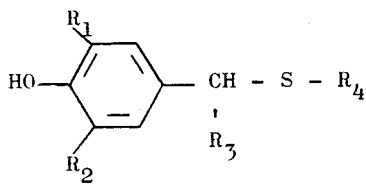

in which $R_1$ and $R_2$, which may be the same or different, represent linear or branched alkyl groups with from 1 to 8 carbon atoms, aralkyl radicals with from 7 to 9 carbon atoms and cycloalkyl radicals with from 5 to 7 carbon atoms; $R_3$ represents hydrogen, a linear or branched alkyl group with from 1 to 8 carbon atoms, cyclohexyl, cyclohexenyl or methylcyclohexenyl, $R_4$ represents a linear or branched alkyl group with from 1 to 12 carbon atoms or

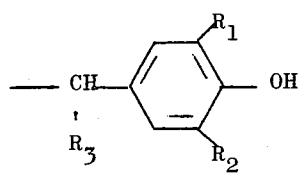

wherein $R_1$, $R_2$ and $R_3$ are as defined above, and of a phenol ester of phosphorous acid of the formula

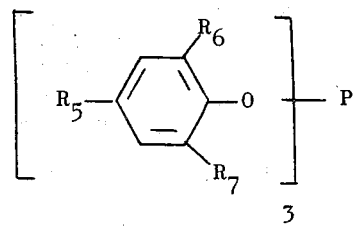

in which $R_5$ represents an alkyl or cycloalkyl group with from 5 to 10 carbon atoms and $R_6$ and $R_7$, which may be the same or different, represent hydrogen, alkyl and cycloalkyl radicals each with from 1 to 7 carbon atoms.

In $R_1$, $R_2$, $R_3$, $R_4$, $R_5$, $R_6$ and $R_7$ alkyl groups include methyl, ethyl, propyl, butyl, pentyl, hexyl, heptyl, octyl, nonyl, decyl, undecyl, dodecyl and their isomers such as isobutyl and t-butyl.

In $R_1$, $R_2$, $R_5$, $R_6$ and $R_7$ cycloalkyl groups include cyclopentyl, cyclohexyl, methylcyclopentyl, methylcyclohexyl, ethylcyclopentyl and dimethylcyclopentyl.

In $R_1$ and $R_2$ aralkyl radicals include benzyl, phenylethyl, phenylpropyl.

Examples of suitable sulphur-containing phenols are:

3,5-dimethyl-4-hydroxybenzyl-methylsulphide,
3,5-dimethyl-4-hydroxybenzyl-ethylsulphide,
3,5-dimethyl-4-hydroxybenzyl-dodecylsulphide
3,5-diethyl-4-hydroxybenzyl-methylsulphide,
3,5-diethyl-4-hydroxybenzyl-isopropylsulphide,
3,5-diethyl-4-hydroxybenzyl-tert.-butylsulphide,
3,5-diisopropyl-4-hydroxybenzyl-methylsulphide,
3,5-diisopropyl-4-hydroxybenzyl-octylsulphide,
3,5-diisopropyl-4-hydroxybenzyl-nonylsulphide,
3,5-di-tert.-butyl-4-hydroxybenzyl-methylsulphide,
3,5-di-tert.-butyl-4-hydroxybenzyl-n-butylsulphide,
3,5-di-tert.-butyl-4-hydroxybenzyl-pentylsulphide,
3-methyl-5-isopropyl-4-hydroxybenzyl-methylsulphide,
3-methyl-5-tert.-butyl-4-hydroxybenzyl-methylsulphide,
3-methyl-5-α-methylbenzyl-4-hydroxybenzyl-methylsulphide,
3-cyclohexyl-5-tert.-butyl-4-hydroxybenzyl-isopropylsulphide,
3-benzyl-5-isopropyl-4-hydroxybenzyl-butylsulphide,
3-α-methylcyclohexyl-5-methyl-4-hydroxybenzyl-methylsulphide,
3-α-methylcyclohexyl-5-tert.-butyl-4-hydroxybenzyl-methylsulphide,
3,5-diisopropyl-4-hydroxy-α-isopropylbenzyl-methylsulphide,
3,5-di-tert.-butyl-4-hydroxy-α-cyclohexylbenzyl-butylsulphide,
3,5-di-tert.-butyl-4-hydroxy-α-cyclohexenylbenzyl-methylsulphide,
3,5-di-tert.-butyl-4-hydroxy-α-methylcyclohexenylbenzyl-methylsulphide,
3-cyclohexyl-5-tert.-butyl-4-hydroxy-α-isopropylbenzyl-methylsulphide,
3-α-methylcyclohexyl-5-methyl-4-hydroxy-α-cyclohexenylbenzyl-butylsulphide,
3,5-bis-(α-methylbenzyl)-4-hydroxy-α-isopropylbenzyl-methylsulphide,
bis-(3,5-dimethyl-4-hydroxybenzyl)-sulphide,
bis-(3,5-diethyl-4-hydroxybenzyl)-sulphide, bis-(3,5-diisopropyl-4-hydroxybenzyl)-sulphide,
bis-(3,5-di-tert.-butyl-4-hydroxybenzyl)-sulphide,
bis-(3,5-dicyclohexyl-4-hydroxybenzyl)-sulphide,
bis-(3,5-di-α-methylbenzyl-4-hydroxybenzyl)-sulphide,
bis-(3-methyl-5-tert.-butyl-4-hydroxybenzyl)-sulphide,
bis-(3-methyl-5-α-methylbenzyl-4-hydroxybenzyl)-sulphide,
bis-(3-methyl-5-cyclohexyl-4-hydroxybenzyl)-sulphide,
bis-(3-tert.-butyl-5-cyclohexyl-4-hydroxybenzyl)-sulphide,
bis-(3,5-diisopropyl-4-hydroxy-α-isopropylbenzyl)-sulphide,
bis-(3,5-di-tert.-butyl-4-hydroxy-α-isopropylbenzyl)-sulphide,
bis-(3,5-di-tert.-butyl-4-hydroxy-α-cyclohexenylbenzyl)-sulphide,
bis-(3,5-di-tert.-butyl-4-hydroxy-α-3-methylcyclohexenylbenzyl)-sulphide,
bis-(3,5-di-tert.-butyl-4-hydroxy-α-4-methylcyclohexenylbenzyl)-sulphide.

Examples of suitable sulphur-containing phenols are:

tris-(4-tert.-butyl-phenyl)-phosphite,
tris-(4-octyl-phenyl)-phosphite,
tris-(4-nonyl-phenyl)-phosphite,
tris-(4-cyclohexyl-phenyl)-phosphite,
tris-(2,4-di-tert-butyl-phenyl)-phosphite,
tris-(2,4-di-α-methylcyclohexyl-phenyl)-phosphite,
tris-(2,6-diisopropyl-phenyl)-phosphite,
tris-(2,6-dinonyl-phenyl)-phosphite,
tris-(2-tert.-butyl-4-methyl-phenyl)-phosphite,
tris-(2-cyclohexyl-4-methyl-phenyl)-phosphite,
tris-(2-cyclopentyl-4-methyl-phenyl)-phosphite,
tris-(2,4,6-triisopropyl-phenyl)-phosphite,
tris-(2,4-dimethyl-6-nonyl-phenyl)-phosphite,
tris-(2,6-dimethyl-4-nonyl-phenyl)-phosphite,
tris-(2-methyl-4-tert.-butyl-6-isopropyl-phenyl)-phosphite,
tris-(2-cyclohexyl-4,6-dimethyl-phenyl)-phosphite,
tris-(2-methyl-4-cyclohexyl-6-isopropyl-phenyl)-phosphite.

Preferred sulfur-containing phenols are compounds in which $R_1$ and $R_2$ represent alkyl groups with from 1 to 4 carbon atoms, $R_3$ represents hydrogen, isopropyl or cyclohexyl and $R_4$ represents methyl or

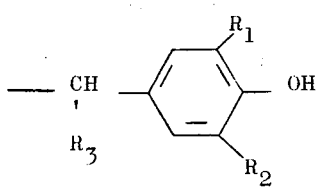

wherein $R_1$, $R_2$, and $R_3$ are as just defined.

It is particularly preferred to use phenols in which $R_1$ and/or $R_2$ represent(s) a tertiary alkyl group.

The following phenols are most preferred:

3-methyl-5-tert.-butyl-4-hydroxybenzyl-methylsulphide,
3,5-di-tert.-butyl-4-hydroxybenzyl-methylsulphide,
bis-(3,5-di-tert.-butyl-4-hydroxybenzyl)-sulphide,
bis-(3,5-di-tert.-butyl-4-hydroxy-α-isopropylbenzyl)-sulphide,
bis-(3,5-di-tert.-butyl-4-hydroxy-α-cyclohexenylbenzyl)-sulphide, the following being particularly preferred:

3-methyl-5-tert.-butyl-4-hydroxybenzyl-methylsulphide,
bis-(3,5-di-tert.-butyl-4-hydroxybenzyl)-sulphide.

The following phenol esters of phosphorous acid are most preferred:

tris-(4-nonyl-phenyl)-phosphite,
tris-(2-cyclohexyl-4-methyl-phenyl)-phosphite,
tris-(2-cyclopentyl-4-methyl-phenyl)-phosphite,
tris-(2,4,6-triisopropyl-phenyl)-phosphiate, the following being particularly preferred:

tris-(4-nonyl-phenyl)-phosphite,
tris-(2-cyclohexyl-4-methyl-phenyl)-phosphite.

Sulphur-containing phenols and their production is known in the art. For example, mononuclear, sulphur-containing phenols of the above general formula are obtained according to French Patent No. 1,569,743 by reacting 3,5-dialkyl-4-hydroxy-benzenes with formaldehyde and mercaptan in the presence of a base in an alcohol as solvent.

Binuclear, sulphur-containing phenols of the above general formula can be obtained, for example, according to German Auslegeschrift 1,233,879 by reacting 2 mols of a 2,6-substituted, sterically hindered phenol with from 2 to 6 mols of formaldehyde and from 1 to 4 mols of alkalisulphide or hydrosulphide in the presence of an alcoholic solvent at a temperature of from about 25° to about 150°C.

Formaldehyde can also be replaced by other aldehydes such as, for example, isobutylraldehyde, tetrahydrobenzaldehyde, 3-methyl-$\Delta^3$-tetrahydrobenzaldehyde and 4-methyl$\Delta^3$-tetrahydrobenzaldehyde.

The phenol esters of phosphorous acid are usually obtained by reacting phenols and phosphorous trichloride with elimination of hydrogen chloride or by transesterifying alkyl-substituted or cycloalkyl-substituted phenols with triphenyl phosphite under elimination of phenol.

The stabiliser systems according to the invention are non-discolouring and highly effective when used in very low amounts.

The stabiliser combination is preferably added in an amount of 0.05 to 5 parts by weight, most preferably 0.1 to 1 part by weight per 100 parts by weight of transpolypentenamer. The weight ratio of sulphur-containing phenol to phenol ester of phosphorous acid is preferably 4 : 1 to 1 : 4, most preferably 2 : 1 to 1 : 2.

The stabiliser combination can be incorporated into a solution of the polypentenamer before its recovery or by mixing on mixing rolls or in an internal mixer. Its constituents can be incorporated as a mixture.

The usual additives, such as fillers or plasticisers can be added. The transpolypentenamer can be vulcanised as usual be added.

EXAMPLE 0.1% of 3-methyl-5-tert.-butyl-4-hydroxybenzyl-methylsulphide and 0.1% of tris-nonylphenylphosphite (both based on polymer) are added to, and uniformly mixed with, a 10% solution of trans-1,5-polypentenamer in toluene. The toluene is distilled off by introducing the polymer solution, with stirring, into water heated to 98°C. The polymer particles thus obtained are separated from the water and dried in a drying cabinet at 70°C.

The product has a Mooney value ML-4'/100°C (DIN 53 523) of 102 and a Defo-H/E (DIN 53 514) of 850/15.

| Days | Ageing test (DIN 53 508) at 100°C (hot air) ML-4' / 100°C | Defo-H/E |
|---|---|---|
| 0 | 102 | 850/15 |
| 1 | 104 | 850/15 |
| 3 | 104 | 875/14 |
| 6 | 105 | 875/15 |

Further tests and results are given in the following Table:

TABLE

| | | | HA — Ageing 100°C | | | | | | | |
|---|---|---|---|---|---|---|---|---|---|---|
| | | | 0 | | 1 | | 3 | | 6 d | |
| No. | Stabiliser | phr | ML | DH/DE | ML | DH/DE | ML | DH/DE | ML | DH/DE | D |
| 1 | A | 0.25 | 96 | 875/16 | 102 | 1000/22 | 106 | 1450/31 | x | 2400/43 | x |
| 2 | A | 0.50 | 110 | 1075/24 | 112 | 1125/28 | 123 | 1500/31 | 143 | 2900/51 | x |
| 3 | B | 0.25 each | 103 | 750/16 | 106 | 725/14 | 106 | 750/16 | 106 | 1050/27 | x |
| 4 | C | 0.25 | 92 | 875/27 | x | 1250/29 | x | 1550/39 | x | 1900/45 | x |
| 5 | D | 0.3 + 0.6 | 102 | 750/14 | 104 | 825/13 | x | 1500/31 | x | 1750/28 | x |
| 6 | E | 0.25 | 100 | 875/14 | 106 | 950/16 | 108 | 1175/23 | 109 | 1750/32 | x |
| 7 | F | 0.1 + 0.1 | 100 | 850/12 | 100 | 850/10 | x | 1225/19 | x | 1300/25 | x |
| 8 | G | 0.25 | 105 | 850/18 | 102 | 900/18 | 105 | 900/20 | 107 | 1350/26 | x |
| 9 | H | 0.25 each | 104 | 775/17 | 100 | 825/16 | 102 | 800/16 | 104 | 800/17 | x |
| 10 | I | 0.25 | 105 | 800/19 | 104 | 950/20 | 112 | 1200/28 | 119 | 1450/36 | x |
| 11 | J | 0.25 each | 102 | 700/18 | 103 | 800/17 | 104 | 775/18 | 105 | 900/20 | x |
| 12 | K | 0.25 | 110 | 1200/20 | 114 | 1125/28 | x | 1400/37 | x | 1450/46 | x |
| 13 | L | 0.25/0.25 | 108 | 850/14 | 109 | 825/14 | 106 | 875/14 | 108 | 900/14 | x |
| 14 | L | 0.1/0.1 | 102 | 875/14 | 104 | 850/15 | 105 | 900/15 | 106 | 900/15 | x |
| 15 | L | 0.05/0.05 | 102 | 825/15 | 105 | 850/14 | 106 | 850/15 | 106 | 975/15 | x |

A = 2,2'-methylene-bis-(4-methyl-6-tert.-butylphenol),
B = 2,2'-methylene-bis-(4-methyl-6-tert.-butylphenol) + tris-(4-nonyl-phenyl)-phosphite,
C = 2,6-di-tert.-butyl-4-methyl-phenol,
D = 2,6-di-tert.-butyl-4-methyl-phenol + tris-(4-nonyl-phenyl)-phosphite,
E = 2-cyclohexyl-4-methyl-6-tert.-butyl-phenol,
F = 2-cyclohexyl-4-methyl-6-tert.-butyl-phenol + tris-(4-nonyl-phenyl)-phosphite,
G = bis-(3,5-di-tert.-butyl-4-hydroxybenzyl)-sulphide,
H = bis-(3,5-di-tert.-butyl-4-hydroxybenzyl)-sulphide + tris-(4-nonyl-phenyl)-phosphite,
I = bis-(3,5-di-tert.-butyl-4-hydroxy-α-isopropylbenzyl)-sulphide,
J = bis-(3,5-di-tert.-butyl-4-hydroxy-α-isopropylbenzyl)-sulphide + tris-(4-nonyl-phenyl)-phosphite,
K = 3-methyl-5-isopropyl-4-hydroxybenzyl-methylsulphide,
L = 3-methyl-5-isopropyl-4-hydroxybenzyl-methylsulphide + tris-(4-nonyl-phenyl)-phosphite;
D = discolouring
ND = non-discolouring.

What we claim is:

1. A stabilizer consisting essentially of a mixture of
a. a compound of the formula

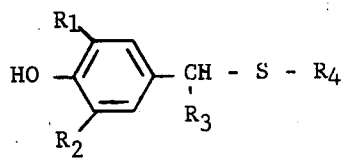

wherein $R_1$ and $R_2$ each individually are alkyl having 1 to 8 carbon atoms, aralkyl having 7 to 9 carbon atoms or cycloalkyl having from 5 to 7 carbon atoms; $R_3$ is hydrogen, alkyl having 1 to 8 carbon atoms, cyclohexyl, cyclohexenyl or methylcyclohexenyl and $R_4$ is alkyl having 1 to 8 carbon atoms or

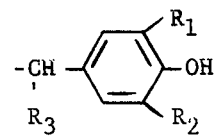

wherein $R_1$, $R_2$ and $R_3$ are as aforesaid and
b. a compound of the formula $$\left[ R_5 \underset{R_7}{\overset{R_6}{\diagup\!\!\!\diagdown}} O \right]_3 P$$

wherein $R_5$ is alkyl or cycloalkyl having from 5 to 10 carbon atoms and $R_6$ and $R_7$ are each individually hydrogen, alkyl having 1 to 7 carbon atoms or cycloalkyl having up to 7 carbon atoms, the weight ratio of (a) to (b) being 4:1 to 1:4.

2. The stabilizer of claim 1 wherein $R_1$ and $R_2$ are alkyl having 1 to 4 carbon atoms, $R_3$ is hydrogen, isopropyl or cyclohexyl and $R_4$ is methyl or

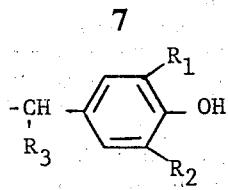
wherein $R_1$, $R_2$ and $R_3$ are as defined immediately above.
3. The stabilizer of claim 1 wherein the weight ratio of (a):(b) is 2:1 to 1:2.
* * * * *